United States Patent
Garg et al.

(10) Patent No.: US 7,463,681 B2
(45) Date of Patent: Dec. 9, 2008

(54) ARCHITECTURE FOR FEEDBACK LOOPS IN DECISION FEEDBACK EQUALIZERS

(75) Inventors: Rahul Garg, Haryana (IN); Kiran Devanahalli, Karnataka (IN); Aparna Chakrakodi Krishnashastry, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 608 days.

(21) Appl. No.: 11/121,475

(22) Filed: May 4, 2005

(65) Prior Publication Data

US 2005/0254572 A1 Nov. 17, 2005

Related U.S. Application Data

(60) Provisional application No. 60/570,712, filed on May 13, 2004.

(51) Int. Cl.
*H03H 7/30* (2006.01)
*H03H 7/40* (2006.01)

(52) U.S. Cl. .................. 375/233; 375/229; 375/230; 375/231; 375/232

(58) Field of Classification Search ......... 375/229–236, 375/316
See application file for complete search history.

(56) References Cited

U.S. PATENT DOCUMENTS

| | | | |
|---|---|---|---|
| 6,678,310 B1 * | 1/2004 | Andren et al. | 375/147 |
| 6,690,715 B2 * | 2/2004 | Webster et al. | 375/148 |
| 6,754,294 B1 * | 6/2004 | Adireddy et al. | 375/348 |
| 7,116,734 B1 * | 10/2006 | Nergis | 375/346 |
| 7,263,119 B1 * | 8/2007 | Hsu et al. | 375/150 |
| 7,289,559 B2 * | 10/2007 | Chen et al. | 375/233 |
| 7,324,590 B2 * | 1/2008 | Abrishamkar et al. | 375/233 |
| 2001/0036223 A1 * | 11/2001 | Webster et al. | 375/152 |
| 2003/0095593 A1 * | 5/2003 | Tripathi et al. | 375/233 |
| 2003/0161421 A1 * | 8/2003 | Schmidt et al. | 375/346 |
| 2004/0101068 A1 * | 5/2004 | Wang et al. | 375/348 |
| 2004/0125884 A1 * | 7/2004 | Wei et al. | 375/265 |
| 2004/0146129 A1 * | 7/2004 | Lin | 375/348 |
| 2004/0240538 A1 * | 12/2004 | Abrishamkar et al. | 375/233 |
| 2004/0264552 A1 * | 12/2004 | Smee et al. | 375/147 |
| 2005/0018765 A1 * | 1/2005 | Endres et al. | 375/233 |
| 2005/0063498 A1 * | 3/2005 | Chen et al. | 375/348 |
| 2005/0094715 A1 * | 5/2005 | Hwang et al. | 375/148 |
| 2005/0249269 A1 * | 11/2005 | Tomasin et al. | 375/148 |
| 2005/0254571 A1 * | 11/2005 | Garg et al. | 375/233 |
| 2005/0254572 A1 * | 11/2005 | Garg et al. | 375/233 |
| 2007/0165707 A1 * | 7/2007 | Margetts et al. | 375/150 |

* cited by examiner

*Primary Examiner*—Chieh M Fan
*Assistant Examiner*—Jason M. Perilla
(74) *Attorney, Agent, or Firm*—Prakash Nama; Global IP Services, PLLC

(57) ABSTRACT

A decision feedback equalizer (DFE) has an inter symbol interference (ISI) loop and inter chip interference (ICI) loop. A buffer at the input of the DFE loop receives a (CCK based data rate) signal coming into the DFE, retains a predetermined number of chips from each incoming symbol and assists to meet timing requirements by chip management. An outgoing rate for the chips from the buffer may depend on the incoming rate and may be higher than the incoming rate by a known factor. A method of designing a configuration for the DFE takes into consideration the timing delay in the loops. The operation within the DFE loop is pipelined, and any latency due to the pipelining is handled at a CCK demodulator. A method for designing the DFE architecture and an article comprising a storage medium with instructions thereon for executing the method, are also disclosed.

13 Claims, 3 Drawing Sheets

ARCHITECTURE FOR FEEDBACK LOOPS IN DECISION FEEDBACK EQUALIZERS

RELATED APPLICATIONS

Benefit is claimed under 35 U.S.C. 119(e) to U.S. Provisional Application Ser. No. 60/570,712, entitled "An efficient architecture for feedback loops in Spread Spectrum Systems", by Rahul Garg et al., filed May 13, 2004, which is herein incorporated in its entirety by reference for all purposes.

FIELD OF THE INVENTION

The invention generally relates to a feedback based scheme in wireless local area networks, and more particularly to architecture for feedback loops in a decision feedback equalizer (DFE) for spread spectrum systems.

BACKGROUND OF THE INVENTION

DFE is a feedback based scheme for channel equalization in signal handling. For signal processing, the text of the high speed extension of the IEEE standard 802.11b specifies complementary code keying (CCK) as the modulation scheme for 5.5 and 11 Mbps data rates in the 2.4 GHz band. In the CCK modulation scheme, CCK code words are transmitted which correspond to the actual bits to be sent. The IEEE 802.11b CCK codes are polyphase complementary codes (or binary complementary sequences or number of pairs of like elements) with any given separation in one series being equal to the numbers of pairs of unlike elements with the same separation in the other series. For background information on CCK, reference may be had to the article entitled "CCK Modulation delivers 11 Mbps for High Rate IEEE 802.11 Extension" in 'Wireless Symposium/Portable by Design Conference, Spring-1999'. The 802.11b complementary codes in one form have a code length of 8 and a chipping rate of 11 M chips/s. The 8 complex chips comprise a single symbol. Each CCK code word consists of eight chips. In 5.5 Mbps case, incoming bits are divided into blocks of four bits. The MSB two bits are used to select one of the four code words and LSB two bits to perform DQPSK modulation on all the eight chips of the selected code word. Similarly, in 11 Mbps case, incoming bits are divided into blocks of eight bits, MSB six bits are used to select one of the 64 code words and LSB two bits to perform DQPSK modulation. So, each code word is called a 'symbol' and the eight values in each code word are called 'chips'.

A transmitted signal can thus be represented as, $s1 = [c1, c2, c3, c4, c5, c6, c7, c8]$
$s2 = [c1, c2, c3, c4, c5, c6, c7, c8]$
...
...
$sn = [c1, c2, c3, c4, c5, c6, c7, c8]$,
where $s1, s2 \ldots sn$ are the symbols and
$c1, c2 \ldots c8$ are the chips The symbols $s1, s2 \ldots sn$, are transmitted sequentially.

Now, in the receiver, the symbol decision, which is deciding all the eight chips of the symbol, is performed using CCK demodulation. This involves correlation with each of four code words in the 5.5. Mbps case and each of 64 code words in the 11 Mbps case followed by maximum picking. This will be used to remove inter symbol interference. But, to remove the interference caused due to the chips within a symbol, chip decision is used. Symbol decision consists in deciding $s1, s2 \ldots sn$ and chip decision consists in deciding $c1, c2 \ldots c8$ for each symbol.

The codeword is used to modulate the carrier. A base band processor implements the CCK waveform to achieve high data rates over wireless links. The base band processor can generally improve packet error rate performance in multi-path environments through the use of RAKE receiver architecture and Decision Feedback Equalizer. U.S. Pat. No. 6,233,273 to Webster et al on May 15, 2001, teaches regarding RAKE receivers in the context of WLAN applications. However, the question of chip management for interference removal and reducing error propagation in DFE designs needs to be addressed to obtain efficient alternatives for DFE design architecture.

SUMMARY OF THE INVENTION

One embodiment of the invention resides in a method of designing a system configuration for a decision feedback equalizer (DFE) for handling an incoming signal, comprising the steps of: providing an inter symbol interference (ISI) loop for addressing removal of ISI caused on symbols, using symbol decisions; providing an inter chip interference (ICI) loop for addressing removal of ICI caused on chips, using chip decisions; and, using chip management based on timing delay in a feedback loop for ISI removal and ICI removal, for selecting a system configuration for said DFE.

A second embodiment of the invention teaches decision feedback equalizer (DFE) for use in signal handling where CCK is used and is associated with CCK symbols, the DFE comprising: an inter symbol interference (ISI) loop for addressing removal of ISI caused on symbols using symbol decisions; an inter chip interference (ICI) loop for addressing removal of ICI caused on chips, using chip decisions, said DFE being configured to use chip management for controlling ISI removal and ICI removal. Also taught herein is an article comprising a storage medium having instructions thereon which when executed by a computing platform result in a method as stated above.

The present invention teaches various system configurations for the DFE that can implement different feedback arrangements, taking into consideration the system timing requirements. The feedback based scheme provides an efficient DFE without having to use redundant hardware. The incoming signal to the DFE may be packet based and may be passed through a buffer that assists in meeting the timing requirements of the DFE. Even though the invention has specific application to IEEE 802.11b receivers for CCK based rates, the invention is envisaged to be applicable, without limitation in any scenario involving a feedback based DFE for channel equalization.

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is not to be taken in a limiting sense, and the scope of the present invention is defined by the appended claims and their equivalents.

Figure 1:
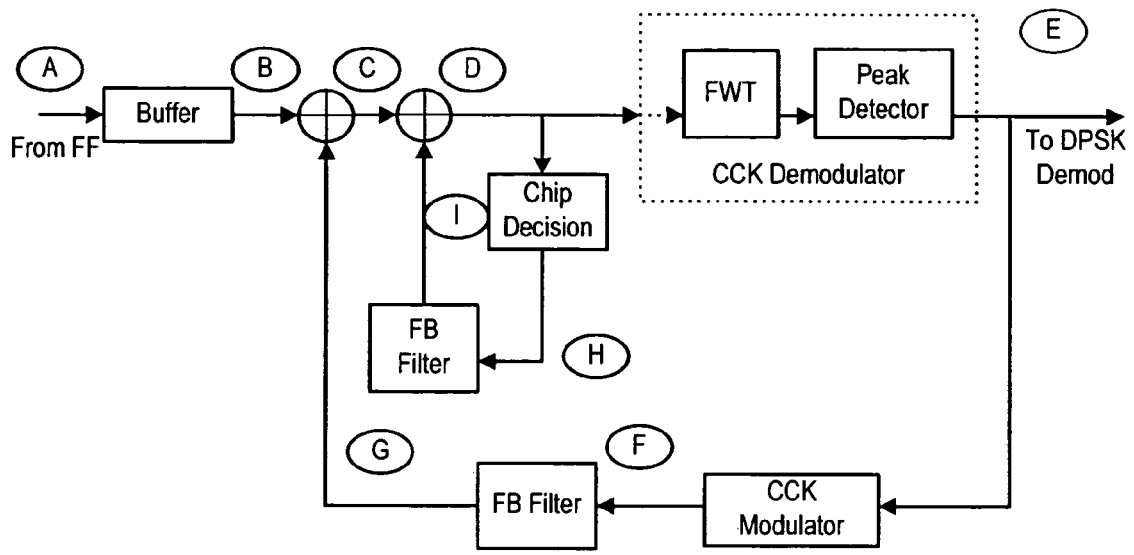
FIG. 1 illustrates a DFE configuration using an ISI removal loop and an ICI removal loop.

A decision feedback equalizer (DFE) is a feedback-based scheme for channel equalization. As shown, the DFE includes two functions namely, ISI removal and ICI removal. FIG. 1 shows a block diagram of the DFE implemented in an 802.11b receiver for the CCK based rates. The input comes from a feed forward filter (not shown in figure) and the output of the CCK Demodulator is sent to a differential phase shift keying (DPSK) demodulator. The same output is sent to the feedback loop for ISI removal. Described herein are alternate configurations for the DFE design, using the present invention.

More particularly, FIG. 1 illustrates a high level view of the DFE architecture. The path C-D-E-F-G-C constitutes the ISI-removal and the path D-H-I-D constitutes the ICI-removal. The input "Buffer" is provided to control the in-flow of CCK chips. The input comes from the Feed-forward (FF) filter after down sampling. The block diagram does not give details of timing.

ISI-Removal:

This part of the DFE removes the effect of Inter Symbol Interference. An exemplary algorithm is briefly described as follows:
1. The CCK demodulator decides which CCK code word was transmitted and outputs the bits corresponding to that (E).
2. The bits are modulated to obtain the ideal CCK code word (F).
3. The code word (F) is passed through a feedback filter (G). The coefficients of these are estimated from the post-cursor components of the channel impulse response (CIR).

The interference component (G) so obtained is subtracted from the chips of the next symbol at B. This cancels the ISI.

ICI-Removal:

The channel also introduces Inter Chip Interference. An exemplary algorithm to cancel this effect is as follows:
1. Chip-decision is made on the present chip (H).
2. A similar feedback filter filters the decision (I).
3. The output of the decision (I) is subtracted from the next chip C.

Timing

The timing of the data flow is discussed in the following.

ISI Loop:

The total loop time (forward path delay+reverse path delay) should not exceed one CCK symbol. CCK symbol rate is 1.375 MHz. CCK correlation is a computation intensive operation. Pipelining is used for low area implementation. This leads to pipeline latency. CCK code words arrive at 11 MHz rate. All 8 chips of the code word are needed for symbol decision. This property is used to account for the latency. The first few input chips are buffered. In the meantime, the symbol decision of the previous symbol is done and is available for ISI cleaning of the present symbol. Then, the cleaned chips are sent to the CCK demodulator. This is done at a faster rate so that chips do not keep queuing up at the buffer.

ICI Loop:

ICI removal contributes to the loop time of ISI, as it is present on the forward path. This is a three-step process. The total time taken for this should not exceed the chip period ($\frac{1}{11}$ microseconds) ideally. However, due to the buffering done for ISI, the actual chip rate will be higher and therefore, the constraint is tighter.

For ICI cleaning, the input chips C and the cleaning value (I) must arrive at the same time. For ISI cleaning, the input chips (B) and the cleaning value (G) must arrive at the same time. The CCK Demodulator takes its inputs from D. The first three chips from the feed forward filter are stored in the buffer. When the fourth chip is entering the buffer, the first chip is shifted out. It is cleaned and sent to CCK demodulator. In the meantime, the second is sent out and so on. So, the buffer contents will look as seen below, in time.

Buffer contents are shown below:

TABLE 1

Buffer Contents

| Time (Clk44 Cycles) | Buffer | |
|---|---|---|
| 0 | C0 | |
| 1 | C0 | |
| 2 | C0 | |
| 3 | C0 | |
| 4 | C0, C1 | |
| 5 | C0, C1 | |
| 6 | C0, C1 | |
| 7 | C0, C1 | |
| 8 | C0, C1, C2 | |
| 9 | C0, C1, C2 | |
| 10 | C0, C1, C2 | |
| 11 | C0, C1, C2 | |
| 12 | C0, C1, C2, C3 | |
| 13 | C0, C1, C2, C3 | |
| 14 | C1, C2, C3, | → C0 leaves the buffer |
| 15 | C1, C2, C3 | |
| 16 | C2, C3, C4 | → C1 leaves the buffer |
| 17 | C2, C3, C4 | |
| 18 | C3, C4 | → C2 leaves the buffer |
| 19 | C3, C4 | |
| 20 | C4, C5 | → C3 leaves the buffer |
| 21 | C4, C5 | |
| 22 | C5 | → C4 leaves the buffer |
| 23 | C5 | |
| 24 | C6 | → C5 leaves the buffer |
| 25 | C6 | |
| 26 | — | → C6 leaves the buffer |
| 27 | — | |
| 28 | — | → C7 by passes buffer |
| 29 | — | |
| 30 | — | |
| 31 | — | |
| 32 | C8 | |
| 33 | C8 | |

With the above exemplary case, 13 cycles are available for CCK Demodulation.

Exemplary Buffer details:

Length of the buffer is 4.

Input is coming at 11 MHz. (Down sampled values of feed-forward filter)

Once the buffer is full with first 4 values of a symbol, data starts leaving the buffer at 22 MHz, so that by the time $8^{th}$ chip is filtered out from the feed forward filter, it is ready to enter the DFE loops.

Buffer is cleared towards the end of the symbol.

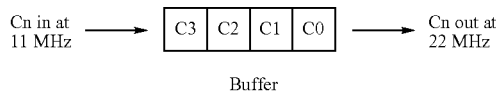

Figure 2:
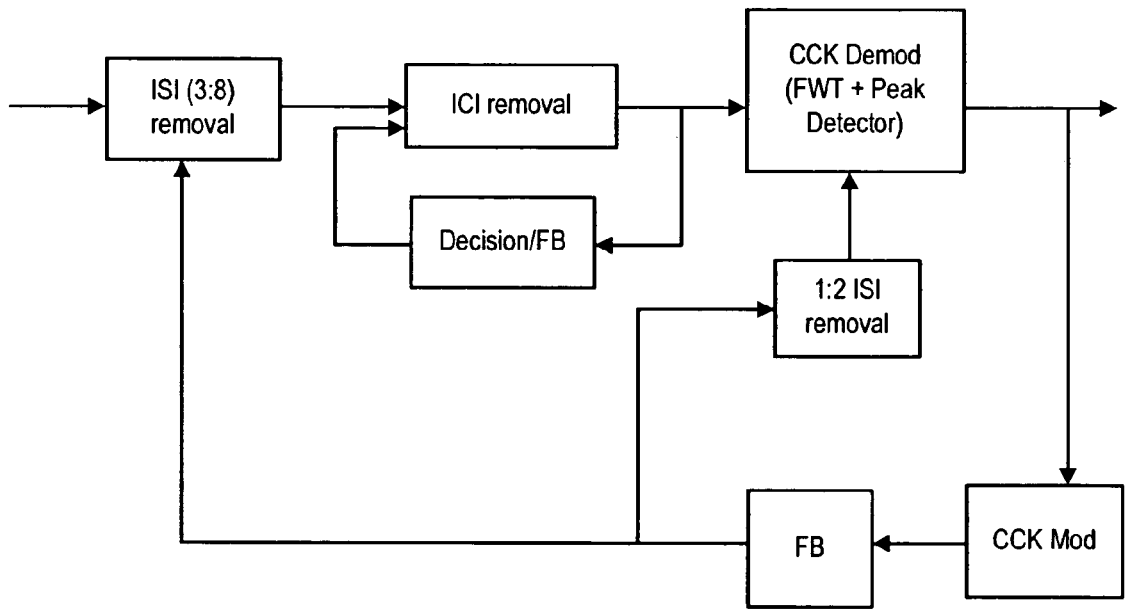
FIG. 2 illustrates one embodiment of the DFE.

FIG. 2 illustrates a DFE architecture including the ISI removal loop and the ICI removal loop similar to the illustration in FIG. 1; however, it is seen from the illustration in FIG. 2 that after the feedback filter in the ISI loop, part of the ISI removal is done at the CCK demodulator which cooperates with a peak detector. In the context of FIG. 2, if the CCK demodulator delay is higher, the ISI cleaning due to the first 2 chips is performed in the correlator stages of the demodulator.

Figure 3:
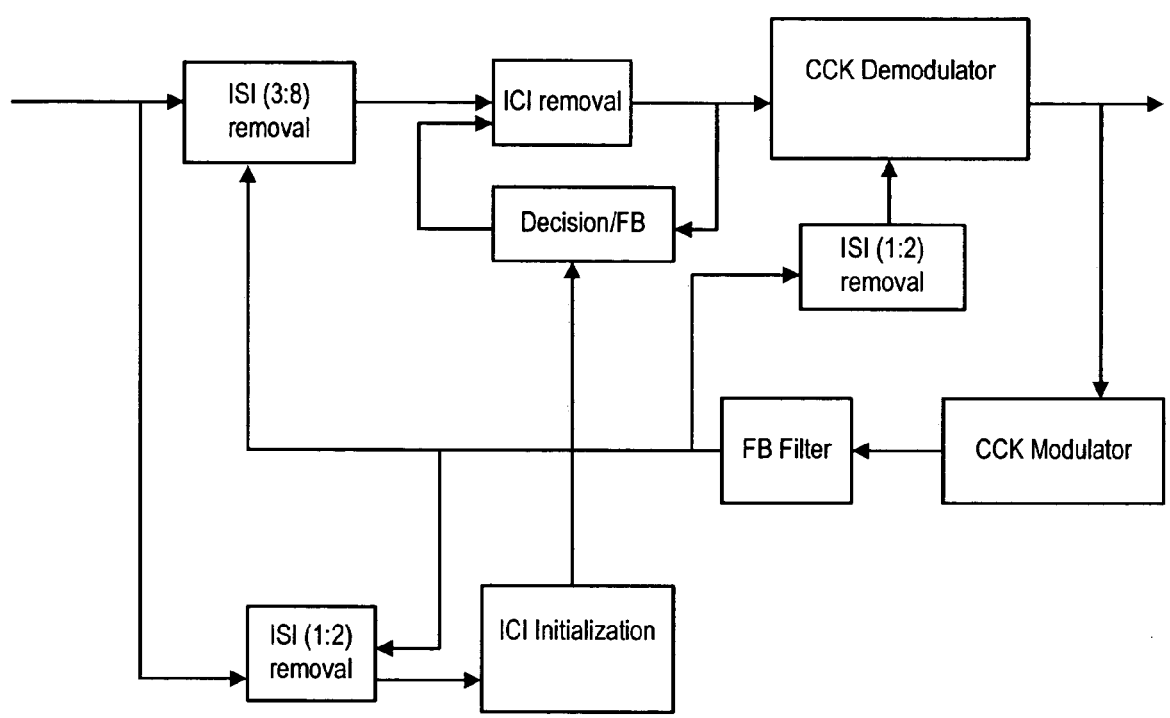
FIG. 3 illustrates a second embodiment of the DFE showing a modified configuration; and, FIG. 4 illustrates a general purpose computing platform that can be used in implementing the invention.

FIG. 3 illustrates a further modified DFE architecture which adds a feedback link to the FIG. 2 arrangement. The added link is by way of obtaining a tap from the ISI feedback loop and connecting the tap to the ICI loop, so as to obtain a system configuration that provides a hybrid structure for cleansing ISI and ICI based on symbol and chip decisions. The added link includes a box labeled "ICI Initialization".

The following is noted in the context of FIGS. 2 and 3: The first 2 chips will be cleaned by the buffer memory of the ICI itself. Expediently, the cleaned first 2 chips will be fed to the FWT along with the other chips, which have the exact cleaning from the FB path initialized. (ICI scheme also does partial ISI cleaning), (Embedded Partial ISI-ICI in ISI)

The first 2 chips will be passed directly through the FWT but the remaining chips would have to be cleaned in the regular loop.

The foregoing is a description of system configurations for the DFE that can implement different feedback arrangements, taking into consideration the system timing requirements. The feedback based scheme provides an efficient DFE without having to use redundant hardware. As described, the DFE cooperates with a buffer that assists in meeting the timing requirements of the DFE as explained in detail above. As explained earlier in the context of the ISI loop, pipelining is used in the invention for low area implementation. However, latency or delay due to pipelining is handled at the CCK demodulator input as it always waits for all the eight chips of the symbol to arrive. Even though the invention has specific application to IEEE 802.11b receivers for CCK based rates, the invention is envisaged to be applicable, without limitation in any scenario involving feedback based DFE for channel equalization.

Computations required for implementing the design method for the DFE described herein may be done using a general purpose computing platform or any other suitable computing arrangement.

Figure 4:
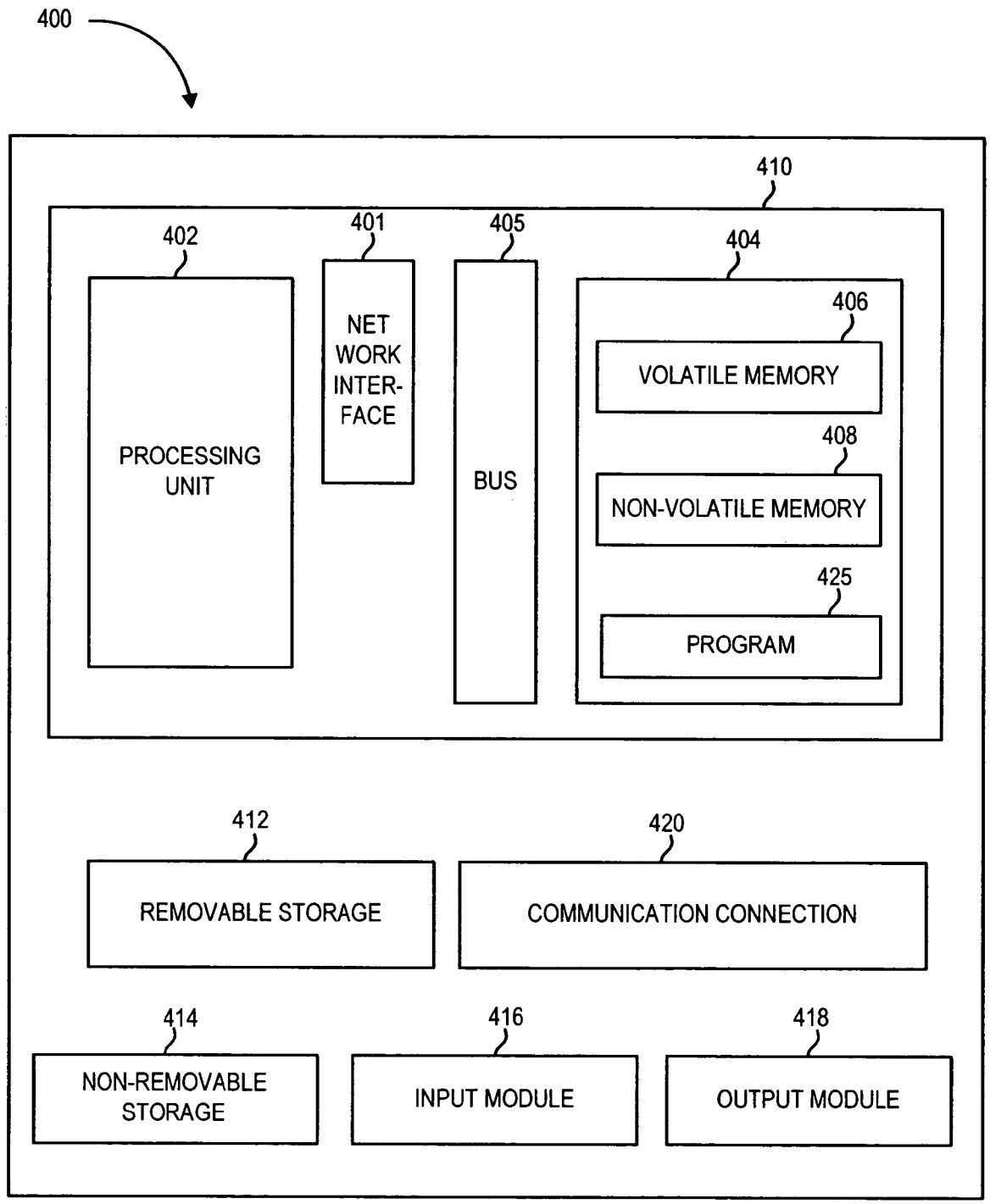

Various embodiments of the present subject matter can be implemented in software, which may be run in the environment shown in FIG. 4 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types)), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 4 shows an example of a suitable computing system environment for implementing embodiments of the present subject matter. FIG. 4 and the following discussion are intended to provide a brief, general description of a suitable computing environment in which certain embodiments of the inventive concepts contained herein may be implemented.

A general computing device in the form of a computer 410 may include a processing unit 402, memory 404, removable storage 412, and non-removable storage 414. Computer 410 additionally includes a bus 405 and a network interface (NI) 401. Computer 410 may include or have access to a computing environment that includes one or more user input devices 416, one or more output modules or devices 418, and one or more communication connections 420 such as a network interface card or a USB connection. The one or more user input devices 416 can be a touch screen and a stylus and the like. The one or more output devices 418 can be a display device of computer, computer monitor, TV screen, plasma display, LCD display, display on a touch screen, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 412 and non-removable storage 414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a computer program 425 may include machine-readable instructions capable of handling a packet based input signal, to perform computations in using the ISI loop and an inside ICI loop, and provide different DFE architectures for feedback loops in spread spectrum systems. In one embodiment, the computer program 425 may be included on a CD-ROM and loaded from the CD-ROM to a hard drive in non-volatile memory 408. The machine-readable instructions cause the computer 410 to decode according to the various embodiments of the present subject matter.

The foregoing is the description of exemplary implementations of the method and DFE apparatus for an improved feedback based loop DFE design, satisfying the design-timing requirements. The embodiments described above use a buffer and control of a timing delay in the ISI and ICI loops to accomplish the objective of providing an efficient DFE architecture. The above-described implementation is intended to be applicable, without limitation, to situations where DFE design architecture needs to be addressed, as for example in 802.11b receivers with CCK based rates. The description hereinabove is intended to be illustrative, and not restrictive.

The design approach for DFE architecture described herein is applicable generally to any communication system requiring a DFE with an improved feedback loop based design, and the embodiments described herein are in no way intended to limit the applicability of the invention. In addition, the techniques of the various exemplary embodiments are useful to the design of any hardware implementations of software, firmware, and algorithms in the context of decoding in general. Many other embodiments will be apparent to those skilled in the art. The scope of this invention should therefore be determined by the appended claims as supported by the text, along with the full scope of equivalents to which such claims are entitled.

The invention claimed is:

1. A method of designing a system configuration for a decision feedback equalizer (DFE) for handling an incoming signal, comprising the steps of:
   providing a buffer for receiving said incoming signal;
   providing an inter symbol interference (ISI) loop for addressing removal of ISI caused on symbols, using symbol decisions;
   providing an inter chip interference (ICI) loop for addressing removal of ICI caused on chips, using chip decisions; and,
   using buffer and chip management based on timing delay in a feedback loop for selecting a system configuration for said DFE to remove ISI and ICI,
   wherein said incoming signal is encoded with complementary code keying (CCK) symbols, said incoming signal has code-words/symbols each having chips, and said step of using buffer and chip management allows for symbol decision based cleaning for ISI removal by the ISI loop, followed by chip decision based cleaning for ICI removal by the ICI loop.

2. The method as in claim 1 including the step of using a CCK demodulator, wherein the step of using buffer and chip management includes a step of removing a predetermined number of chips from said ISI loop.

3. The method as in claim 2, wherein the step of removing a predetermined number of chips from said ISI loop includes moving said predetermined number of chips to a first stage of a Fast Walsh Transform that is included in said CCK demodulator.

4. The method as in claim 3, where the predetermined number of chips is two.

5. The method as in claim 1, wherein the incoming signal is a packet based signal, and further including the steps of:
   using said buffer for controlling inflow of chips in said incoming signal, said buffer providing buffer management in addition to said chip management to assist in selecting the system configuration for the DFE,
   limiting a number of chips that can be stored in said buffer at any given time,
   releasing stored chips from said buffer when new chips come into the buffer,
   wherein an outgoing rate for chips from said buffer is dependent on an incoming rate for chips into said buffer, but is higher than the incoming rate by a predetermined factor.

6. The method as in claim 5, wherein the number of chips that can be stored in the buffer is 4, and wherein said predetermined factor is 2.

7. A method of designing a system configuration for a decision feedback equalizer (DFE) for handling an incoming signal, comprising the steps of:
   providing an inter symbol interference (ISI) loop for addressing removal of ISI caused on symbols, using symbol decisions;
   providing an inter chip interference (ICI) loop following the ISI loop for addressing removal of ICI caused on chips, using chip decisions; and,
   using chip management based on timing delay in a feedback loop, for selecting a system configuration for said DFE to remove ISI and ICI,
   wherein said incoming signal is encoded with complementary code keying (CCK) symbols and has code-words/symbols each having chips and the step of providing an ISI loop further comprises:
   using a CCK demodulator to demodulate transmitted CCK symbols of said incoming signal, and producing bits corresponding to said transmitted CCK symbols;
   modulating the produced bits to obtain an ideal CCK symbol;
   passing said ideal CCK symbol through a feedback filter to obtain an interference component; and,
   subtracting said interference component from chips of a next symbol in said incoming signal.

8. A method of designing a system configuration for a decision feedback equalizer (DFE) for handling an incoming signal, comprising the steps of:
   using a buffer for controlling inflow of chips in said incoming signal;
   providing an inter symbol interference (ISI) loop for addressing removal of ISI caused on symbols, using symbol decisions;
   providing an inter chip interference (ICI) loop following the ISI loop for addressing removal of ICI caused on chips, using chip decisions; and,
   using buffer and chip management based on timing delay in a feedback loop, for selecting a system configuration for said DFE to remove ISI and ICI,
   wherein said incoming signal is a packet based signal encoded with complementary code keying (CCK) symbols and has code-words/symbols each having chips, wherein the step of providing an ISI loop further comprises:
   using a CCK demodulator to demodulate transmitted CCK symbols of said incoming signal, and producing bits corresponding to said transmitted CCK symbols;

modulating the produced bits to obtain an ideal CCK symbol;

passing said ideal CCK symbol through a feedback filter to obtain an interference component; and, subtracting said interference component from chips of a next symbol in said incoming signal.

9. A decision feedback equalizer (DFE) for use in handling of an incoming signal encoded with complementary code keying (CCK) symbols, said DFE comprising:

a buffer for receiving and timing said incoming signal;

an inter symbol interference (ISI) loop for addressing removal of ISI caused on symbols using symbol decisions;

an inter chip interference (ICI) loop for addressing removal of ICI caused on chips, using chip decisions;

wherein said DFE is configured to use chip management for controlling ISI removal and ICI removal, said buffer providing buffer management in addition to chip management for selecting a system configuration for said DFE, said incoming signal has CCK code-words/symbols each having chips, and said chip management allows for symbol decision based cleaning for ISI removal by the ISI loop, followed by chip decision based cleaning for ICI removal by the ICI loop.

10. The DFE as in claim 9, wherein chip management includes removing a predetermined number of chips away from said ISI loop.

11. The DFE as in claim 10, wherein removing said predetermined number of chips includes moving said predetermined number of chips from said ISI loop to a first stage of a Fast Walsh Transform that is included in a CCK demodulator.

12. A decision feedback equalizer (DFE) for use in handling an incoming signal encoded with complementary code keying (CCK) symbols, said DFE comprising:

an inter symbol interference (ISI) loop for addressing removal of ISI caused on symbols using symbol decisions;

an inter chip interference (ICI) loop for addressing removal of ICI caused on chips, using chip decisions;

wherein said DFE being configured to use chip management for controlling ISI removal and ICI removal, said incoming signal has code-words/symbols each having chips, wherein said ISI loop further comprises:

a CCK demodulator to demodulate transmitted CCK symbols of said incoming signal, and producing bits corresponding to said transmitted CCK symbols;

a modulator for modulating the produced bits to obtain an ideal CCK symbol;

a feedback filter for receiving said ideal CCK symbol to obtain an interference component; and, means for subtracting said interference component from chips of a next symbol in said incoming signal.

13. An article comprising a storage medium having instructions thereon which when executed by a computing platform result in the execution of a method for designing a system configuration for a decision feedback equalizer (DFE) for handling an incoming signal, comprising the steps as in claim 7.

* * * * *